J. G. Baker,
Cutting Glaziers' Point.
N° 20,539.      Patented June 15, 1858.
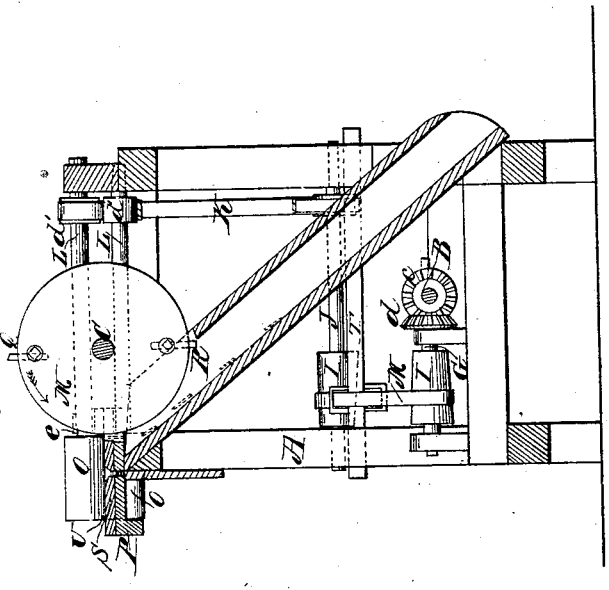
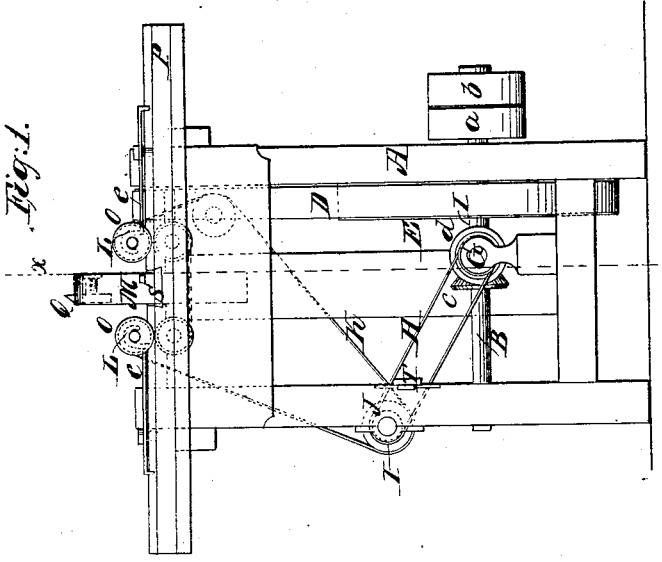
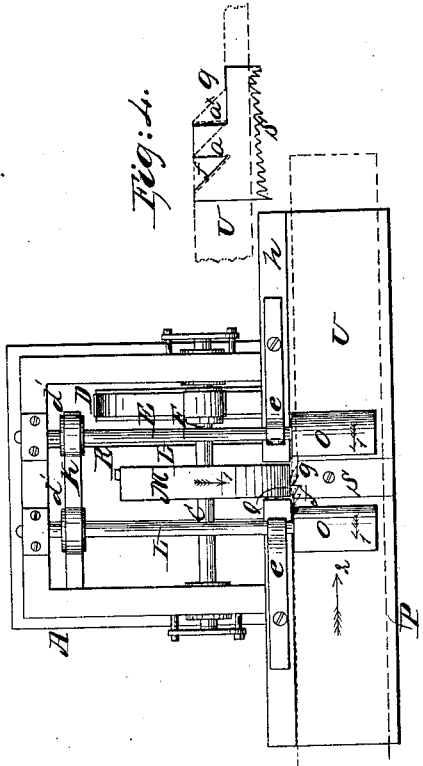

UNITED STATES PATENT OFFICE.

JNO. G. BAKER, OF NEW BRUNSWICK, NEW JERSEY.

MACHINE FOR CUTTING GLAZERS' TINS.

Specification of Letters Patent No. 20,539, dated June 15, 1858.

*To all whom it may concern:*

Be it known that I, JOHN G. BAKER, of New Brunswick, in the county of Middlesex and State of New Jersey, have invented a new and Improved Machine for Cutting Glaziers' Tins or Points, which are used in connection with putty for securing glass in window sashes, and also for cutting shoenails and similar articles of trilateral form; and I do hereby declare that the following is a full, clear, and exact description of the same, reference being had to the annexed drawings, making a part of this specification, in which—

Figure 1 is a side view of my improvement. Fig. 2, is a vertical section of ditto, taken in the line (*x*), (*x*), Fig. 1. Fig. 3, is a plan or top view of ditto. Fig. 4, is an enlarged detached view of the die or bolster and a portion of the plate from which the points are cut.

Similar letters of reference indicate corresponding parts in the several figures.

This invention consists in the employment or use of a rotating drum with cutters attached, a stationary die or bolster, and feed rollers, arranged as hereinafter described whereby the tins or points may be cut from the sheet metal with great rapidity and with but a moderate expenditure of power.

To enable those skilled in the art to fully understand and construct my invention I will proceed to describe it.

A, represents a rectangular framing which may be constructed in any proper way to support the working parts.

B, is a shaft which is placed horizontally in the lower part of the framing, said shaft having a driving pulley (*a*) and loose pulley (*b*) on one end.

C, is a shaft which is placed on the upper part of the framing A, parallel with shaft B. This shaft C, is driven from the shaft B, by means of a belt D, which passes around pulleys E, F, placed respectively on the shafts B, C, and of such a relative size as to communicate an increased speed to shaft C.

On the shaft B, at about its center a bevel wheel (*c*) is placed. This wheel gears into a corresponding wheel (*d*), on a shaft G, at right angles to shaft B. From the shaft G, motion is communicated by means of a belt H, and cone pulleys I, I, to a shaft J, which is placed at one side of the framing A, parallel with the shaft G.

From the shaft J, motion is communicated by means of a belt K, to two pairs of shafts L, the shafts of each pair being placed one over the other and a pair placed at each side of a drum or cylinder M, which is placed on shaft C. The shafts L, have pulleys (*d'*) on them, one on each, and the belt K, passes around the several pulleys as shown by the dotted lines in Fig. 1. The lower shaft L, of each pair are fitted in permanent bearings at each end but the front bearings of the upper shafts L, are formed at the end of springs (*e*) which have a tendency to press the front ends of the upper shafts downward. On the front ends of both pairs of shafts L, rollers O, are placed and the springs (*e*) press the upper rollers O, on the lower ones.

P, is a horizontal bed which is placed on the upper part of the framing A. This bed has recesses or openings made in it to receive the lower rollers O, the upper surfaces of which project a trifle above the upper surface of the bed P.

To the periphery of the drum M, there are attached cutters Q, R. The cutter Q, is of triangular or V-shape, as shown clearly in Fig. 1, and the cutter R, is of rectangular form its cutting edge being parallel with the axis of the drum as shown in Fig. 3. The cutters Q, R, are attached to the drum at opposite sides of its shaft C, and they are placed on the periphery of the drum one near each edge.

In the upper surface of the bed P, a die or bolster S, is placed transversely and in line with the drum or cylinder M. The inner end of the die or bolster has recesses (*f*) (*g*), made in it corresponding in form respectively to the cutters Q, R. See Figs. 3 and 4.

T, is a belt shipper attached to one side of the framing A, for adjusting the position of the belt H, on the cone pulleys I, I, and thereby regulating as may be necessary the speed of the rollers O, relatively with the drum M.

The operation is as follows: A strip U, of tinned plate is placed on the bed P, and motion being given the shaft B by any proper means the drum or cylinder M, and the rollers O, are rotated in the direction indicated by arrows 1, by the gearing and belts previously described, and the plate U, being between the rollers O, is fed along in the direction indicated by arrow (2), the inner edge of the plate U, bearing against a ledge (h) and moving directly over the recesses (f) (g), made in the inner edge of the die or bolster. As the drum or cylinder M, rotates the cutter Q, cuts points from the edge of the plate U, which moves with such a speed relatively with the rotation of the drum that intermediate portions ($a^x$) are left of the precise size and shape as the points cut from the plate by the cutter Q. These intermediate parts ($a^x$), are cut from the plate by the cutter R, said parts passing directly over the recess (g) and reaching said point at the proper time to be cut from the plate by the cutter R.

Different sized cutters Q, R, may be used, in order to cut different sized tins or points, the speed of the rollers O, being regulated by adjusting the belt H, on the rollers I, I, so that the plate U, may be fed along on the bed as fast as circumstances may require. When a row of points are cut from one side of the plate, the plate is placed between the rollers at the opposite end of the bed P, and a succeeding row cut, and so on until the plate is entirely cut into points. In consequence of cutting the points from the edge of the plate the machine is operated with but a small expenditure of power and the parts being simple the machine may be driven rapidly so as to perform its work very expeditiously.

I would remark that an inclined spout W, may be placed within the framing to convey the tins or points into any proper receptacle prepared to receive them, the inner end of said die or bolster projecting over the upper end of the spout W.

I do not claim, broadly, the cutting of nails from sheet metal, but

Having thus described my invention what I claim as new and desire to secure by Letters Patent, is,—

The rotating drum M, provided with the cutters Q, R, two or more, in combination with the stationary die or bolster S, provided with the recesses (f), (g), and the feed rollers O, arranged to operate substantially as and for the purposes set forth.

JOHN G. BAKER.

Witnesses:
WASHINGTON LAFAYETTE WALKER,
ROBERT C. HELM.